United States Patent [19]

Hines et al.

[11] 4,253,949

[45] Mar. 3, 1981

[54] SEWAGE TREATMENT-FLOTATION APPARATUS

[75] Inventors: David A. Hines; Richard T. Jones; Frank C. Roesler, all of Stockton-on-Tees, England

[73] Assignee: Imperial Chemical Industries Limited, London, England

[21] Appl. No.: 671,543

[22] Filed: Mar. 29, 1976

[30] Foreign Application Priority Data

Apr. 7, 1975 [GB] United Kingdom ............... 14142/75

[51] Int. Cl.³ .............................................. B01D 21/01
[52] U.S. Cl. ................................ 210/703; 210/221.2; 210/194; 210/738
[58] Field of Search ............................ 210/3-8, 210/14, 65, 15, 63, 17, 167, 194, 218, 199, 219, 220, 221, 433, 44, 49, 221 P; 261/29, 36 R, 77, DIG. 75, 168, 164; 209/169, 170

[56] References Cited

U.S. PATENT DOCUMENTS

| | | | |
|---|---|---|---|
| 895,229 | 8/1908 | Beddoes | 210/15 |
| 1,401,598 | 12/1921 | Gahl | 209/170 |
| 1,646,019 | 10/1927 | Forrester | 209/170 |
| 2,987,186 | 6/1961 | Burgoon et al. | 210/7 X |
| 3,439,807 | 4/1969 | Danjes | 210/14 X |
| 3,525,437 | 8/1970 | Kaeding | 209/170 X |
| 3,794,303 | 2/1974 | Hirshon | 261/61 |
| 3,925,208 | 12/1975 | Yost | 210/220 X |

FOREIGN PATENT DOCUMENTS

| | | | |
|---|---|---|---|
| 504471 | 7/1951 | Belgium | 210/194 |
| 513471 | 8/1952 | Belgium | 210/220 |
| 815150 | 11/1974 | Belgium | 210/220 |
| 1042193 | 10/1953 | France | 209/157 |
| 1548964 | 12/1968 | France | 210/220 |

*Primary Examiner*—William A. Cuchlinski, Jr.
*Attorney, Agent, or Firm*—Cushman, Darby & Cushman

[57] ABSTRACT

Solids-liquid separation, wherein a solids-liquid mixture containing dissolved oxygen-containing gas is circulated around a circulatory system comprising a downcomer and a riser, part of the mixture in the riser being introduced into a flotation chamber in which the hydrostatic pressure gradually decreases as the mixture flows upwards, with consequent release from solution of gas bubbles which carry solid particles to the top of the mixture.

14 Claims, 3 Drawing Figures

FIG. 3.
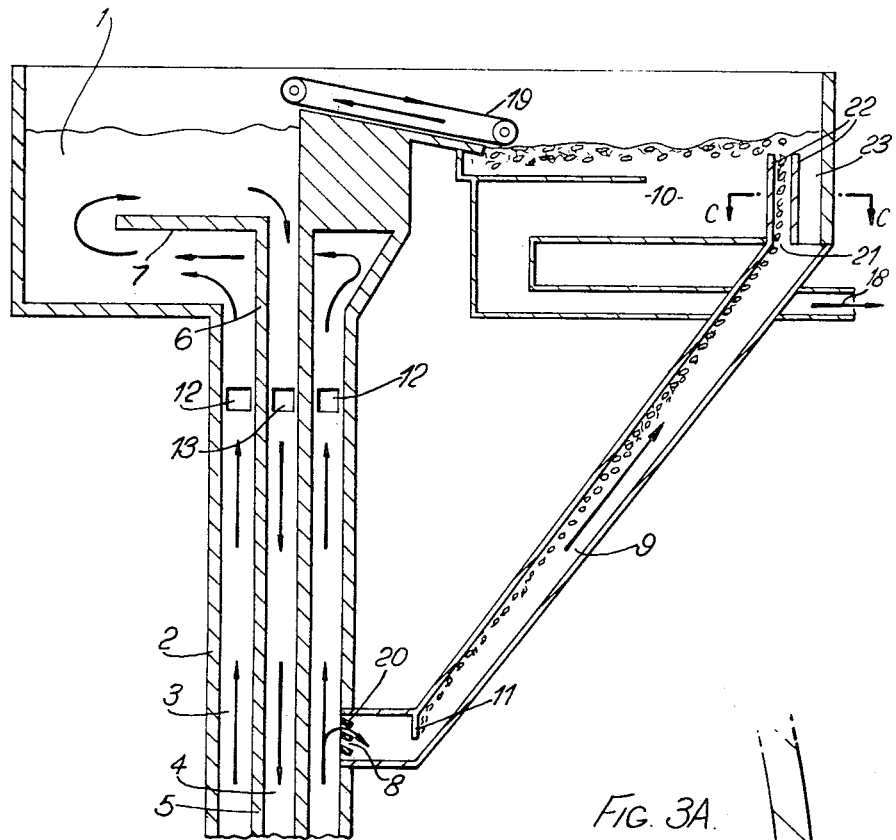
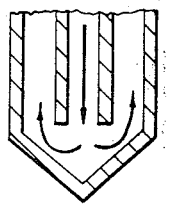
FIG. 3A.
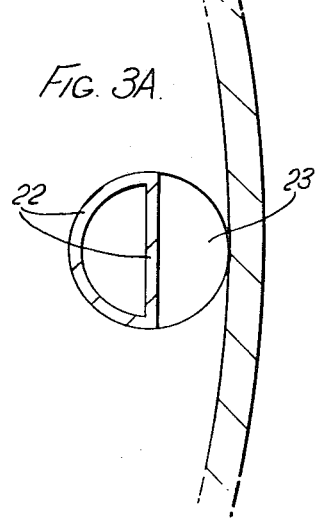

SEWAGE TREATMENT-FLOTATION APPARATUS

The invention of this application is related to the invention in application Ser. No. 467,511, filed May 6, 1974, which is commonly assigned with the present application.

This invention relates to solids-liquid separation and in particular to a method and apparatus for the treatment of liquid carrying biologically-degradable waste material hereinafter referred to as sewage which term is to be understood to include all types of biologically-degradable domestic and industrial waste materials for example normal domestic waste, the effluents produced by farms, food factories and other industries producing such waste.

The methods generally employed in the treatment of sewage comprise essentially a preliminary treatment by physical methods such as screening and sedimentation to remove large suspended solids followed by a secondary treatment by biological methods to remove dissolved and smaller suspended materials. Insofar as it relates to the treatment of sewage the present invention relates to the secondary treatment stage.

Flotation is employed in the secondary treatment of sewage for the removal of suspended solids from the sewage and for the separation and concentration of biological flocculent sludges. In current flotation practice the principal components in a flotation system are a pressurizing pump, air injection facilities, a retention tank and a flotation unit. The sewage or a portion of clarified effluent is pressurised in the presence of sufficient air to achieve super-saturation relative to atmospheric conditions. When the pressure on this super-saturated liquid is released, which may be combined with mixing with sewage at atmospheric pressure, minute air bubbles form in the liquid. Suspended solids are floated by these minute air bubbles which may be attached or become attached to and enmeshed in the solid particles. The air-solids mixture rises to the surface where it is skimmed off. The clarified liquor is removed below.

In present flotation systems a special pump, air injection means and a pressurized tank or vessel are required to effect super-saturation of the solids-liquid mixture.

According to the present invention we provide a method for solids-liquid separation wherein a solids-liquid mixture is circulated around a circulatory system comprising at least two substantially vertical ducts communicating with each other at their upper and lower ends, in a manner such that it flows downwardly in one duct of the system and upwardly in another duct of the system, a gas being supplied to and at least partly dissolved in the mixture, preferably in the downwardly flowing mixture, and a portion of the upwardly flowing mixture containing dissolved gas passing into a flotation chamber connected to the circulatory system in which flotation chamber the hydrostatic pressure gradually decreases as the mixture flows upwards and consequently gas is released from solution and forms gas bubbles attached to solid particles present in the mixture which carry the solid particles to the top of the liquid in the mixture. Subsequently the solid particles carried to the top of the liquid and the resulting clarified liquid below are removed separately from the system.

Also according to the invention we provide an apparatus for solids-liquid separation comprising a circulatory system with a flotation chamber connected thereto, the circulatory system comprising at least two substantially vertical ducts communicating with each other at their upper and lower ends, means for circulating a solids-liquid mixture around the system so that it flows downwardly in one duct of the system and upwardly in another duct of the system and means for supplying a gas to the mixture in the system, preferably to the downwardly circulating mixture, the flotation chamber being connected to the system in a manner such that a portion of the upwardly-flowing mixture containing dissolved gas passes into the flotation chamber and flows upwardly therein. Suitably, means are provided for removing from the system solid particles carried to the top of the liquid and means for withdrawing from the system the resulting clarified liquid below.

The flotation chamber is suitably a cylindrical conduit over the greater part of its length, the solids-liquid mixture containing dissolved gas being supplied to it through an opening or openings at or near its lower end. At its upper end, the conduit opens into a tank or like vessel of greater cross-sectional area than the conduit; such a tank or vessel is commonly referred to, by those skilled in the art, as a "basin". In this basin, which is hereinafter referred to as the flotation basin, the separated solids float on top of the clarified liquid, and the separated solids and the clarified liquid are removed from the basin separately.

Any opening through which solids-liquid mixture is supplied to the flotation chamber is equipped with some form of trap to prevent gas bubbles of excessive size existing in the mixture from entering the flotation chamber and disturbing the flow therein. A suitable form of trap is one which causes the mixture to flow initially downwardly on entering the flotation chamber. The trap may be a plate secured to the wall of the chamber and protruding into the chamber behind the opening and at an angle to the chamber wall. Also several such plates may be combined into a louvre structure. The velocity of flow through the trap or louvre is less than the rising velocity of the bubbles and is suitably not greater than 10 cms/sec which will ensure that no bubbles larger than 1 mm diameter can pass the zone of downward flow in the trap or in the slots of the louvre. Preferably the velocity of flow through the trap or louvre is less than 5 cms/sec.

For good efficiency of the flotation process, ie a substantially complete separation of the solids from the liquid, there should be no strong turbulence or shear flow in the flotation chamber since this tends to disperse the flocs of solids into fine particles which are difficult to separate. The exclusion of preformed gas bubbles of excessive size from the flotation chamber is performed with this end in view. Also with a view to avoiding turbulence and shear the mean velocity of upward flow of liquid in the flotation chamber is suitably kept low, preferably not exceeding 0.3 m/s and especially not exceeding 0.1 m/s.

The depth of the flotation chamber is preferably between 20 meters and 40 meters. With the preferred velocities the residence time of the ascending liquid in the flotation chamber will thus be at least 60 seconds and may be as long as 1000 seconds. Such a long residence time promotes the production of strong flocs with attached air bubbles.

The invention is useful in the biological treatment of sewage, particularly in the aeration stage to separate flocculated sludge particles from liquid effluent. The invention may also be used in the digestion stage. When used in the biological treatment of sewage the gas is an oxygen-containing gas ie oxygen or any gaseous mixture, such as air, containing oxygen.

In co-pending cognated U.K. Applications Nos. 23328/73 and 53921/73 (corresponding to commonly assigned U.S. application Ser. No. 467511) we describe an apparatus for the circulation of liquids comprising a chamber of descending flow (hereinafter referred to as the downcomer) and a chamber of ascending flow (hereinafter referred to as the riser) communicating with each other at their upper and lower ends, means being provided for supplying a gas to liquid in the downcomer. This apparatus may be used in the aeration and/or digestion stages in the biological treatment of sewage, the sewage being circulated around the downcomer/riser system and supplied with an oxygen-containing gas as it passes through the downcomer.

The present invention may be used in conjunction with the apparatus of co-pending cognated U.K. Applications Nos. 23328/73 and 53921/73 (which will form the circulatory system) and with the sewage treatment method described therein. When the present invention is used in conjunction with this apparatus, the flotation chamber is connected to the riser and a portion of a solids-liquid mixture such as sewage flowing up the riser passes into the flotation chamber.

The present invention will hereinafter be described in use with the apparatus of cognated U.K. Applications Nos. 23328/73 and 53921/73 and in terms of a sewage treatment method. It is to be understood however that the present invention is not restricted to use in conjunction with this apparatus and can be used in other solids-liquid separation procedures than those involved in sewage treatment.

The downcomer and riser may be of any convenient cross-sectional shape, eg circular or semi-circular. They may be disposed externally to each other but are preferably disposed within a single structure (preferably cylindrical) divided internally by a partition or partitions or with the downcomer formed by a tube located inside a structural tube, the space between the tubes forming the riser. A wide variety of geometrical arrangements is possible. The system may comprise a plurality of risers and downcomers. The flotation chamber preferably lies adjacent to the upper part of the riser being connected thereto through an opening or openings in the riser wall. Each opening is equipped with a trap to prevent gas bubbles travelling up the riser from entering the flotation chamber.

It is also a suitably geometry for the flotation chamber to be a vertical duct or pipe inserted into the upper part of the riser which may be widened for this purpose. Thus in this case the riser surrounds the flotation chamber. The connection between the riser and the flotation chamber is then by openings, with bubble traps, in the wall of the flotation chamber. One or more external connections penetrating the riser are provided in this case to withdraw the liquid and the flotated solids from the flotation chamber.

Suitably sewage after a preliminary treatment passes into a tank or the like vessel, of the type usually referred to as a basin, which forms the gas-disengagement part of the circulatory system. The downcomer and the riser extend below the level of the base of the gas-disengagement basin. The flotation chamber suitably lies alongside the upper part of the riser and, as described hereinabove, forms at its upper end a flotation basin situated alongside the gas-disengagement basin. Alternatively, the flotation chamber may extend at an upwardly inclined angle away from the upper part of the riser and at its upper end opens into in a flotation basin connected to, but extending to the necessary distance from, the gas-disengagement basin. Solid material rising to the surface of the liquid in the flotation basin may be collected by suitable means, eg scrapers, and transferred back to the gas-disengagement basin and thereby to the circulatory system. Clarified effluent passes out of the flotation basin to another stage of the sewage treatment process. When the basins are situated at or below ground level the structure containing the circulatory system and flotation chamber is a shaft (preferably cylindrical with a side-shaft for the flotation chamber) extending into the ground. The shaft may extend into the ground at a position external to the basins but is preferably below them, the upper ends of the riser and the downcomer opening into the gas-disengagement basin and the upper end of the flotation chamber opening into the flotation basin.

Suitably the riser and downcomer extend for at least 40 meters vertically below the level of sewage in the gas-disengagement basin, but preferably for 80 meters or more, especially 150 to 250 meters below. The depth of the flotation chamber is preferably 20 meters to 40 meters. The suitable ratio of the cross-sectional area of the flotation chamber to that of the riser will vary widely depending on the treatment time in the circulatory system, and it may be as small as 0.01 or as large as 2.0. For readily degradable effluents it will normally be between 0.25 and 2.0.

Any suitable circulating means may be used to circulate sewage around the circulatory system. Very suitably the circulation is produced by injecting an oxygen-containing gas into the system.

In the flotation method of the present invention flotation is achieved by a gradual reduction in pressure. There is no sudden pressure release with consequent high shearing forces. Thus in the treatment of sewage it is possible to pressurize the whole sewage flow rather than the clarified effluent without exposing the friable flocculent sludge to high shearing forces and thereby dispersing the floc into fine particles which are difficult to separate.

In use in the treatment of sewage the invention permits substantial sludge re-cycle without sedimentation and avoids lengthy residence periods in anaerobic tanks. This produces an increased intensity of treatment of the sewage. Flotation is achieved without the necessity for a special compression chamber and pressure release system.

The invention is illustrated by the accompanying drawings wherein:

FIG. 3 is a cross-sectional elevation of a modification of the apparatus shown in FIG. 2, but in which the liquid is circulated by injection thereinto of an oxygen-containing gas (as in FIG. 1) and the flotation chamber is disposed at an upwardly-inclined angle to the riser;

FIG. 3A is a plan view along the line C—C of FIG. 3.

Figure 1:
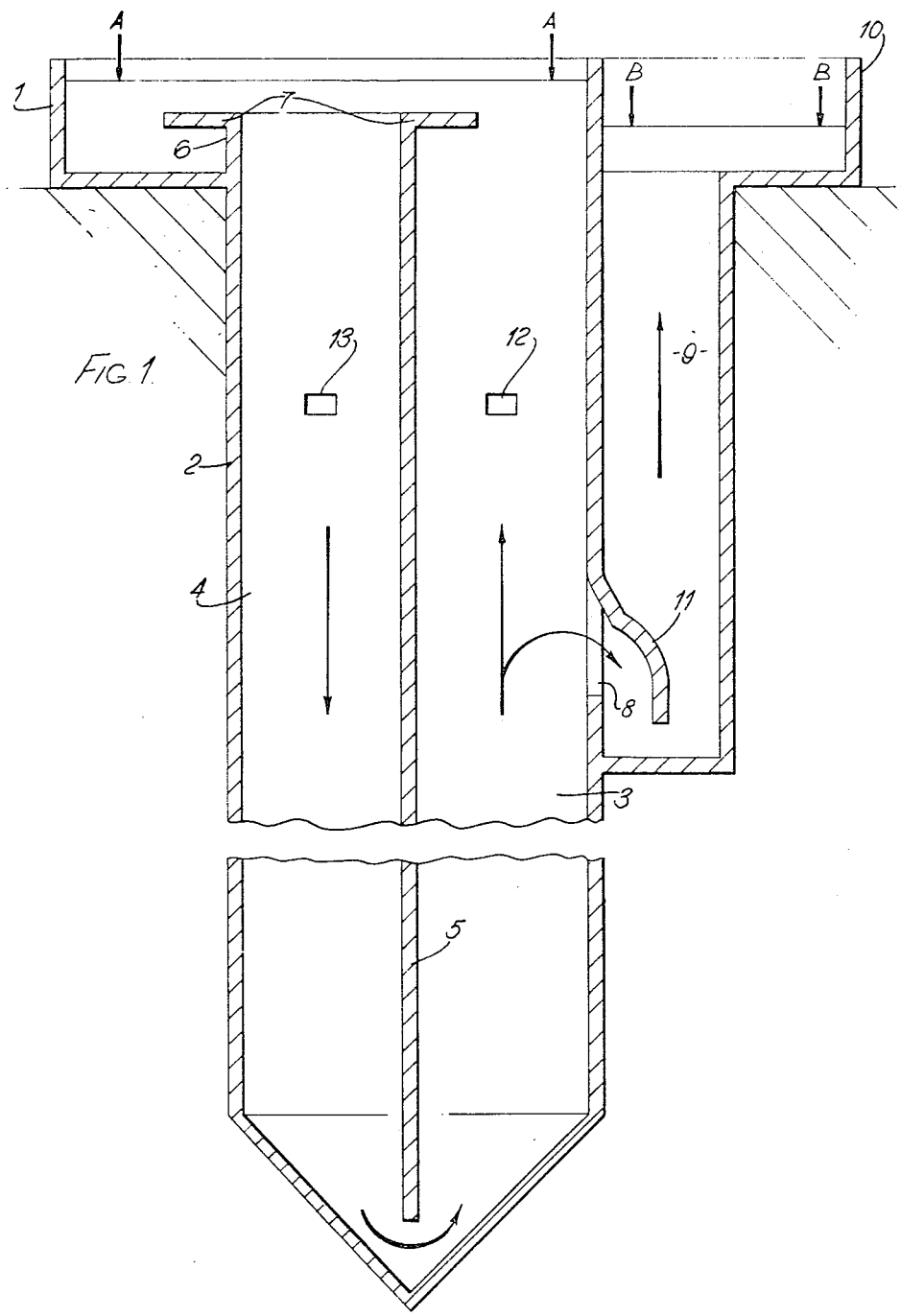
FIG. 1 is a cross-sectional elevation of one form of the apparatus of the invention in which circulation of liquid is achieved by injecting an oxygen-containing gas thereinto.

The apparatus shown in FIG. 1 has a gas-disengagement basin 1 below which a deep shaft 2 extends into the ground and contains riser 3 and downcomer 4 which are separated from one another by partition 5. Riser 3 and downcomer 4 communicate with each other at their upper ends in basin 1 and at the lower end of shaft 2 below partition 5. To achieve a suitable flow pattern in basin 1, the upper end 6 of downcomer 4 (formed by an extension of the wall of shaft 2 and partition 5) extends above the base of the basin and is provided with flow-directing means 7. Riser 3 communicates through opening 8 with a flotation chamber 9, of lesser depth than shaft 2. At its upper end flotation chamber 9 opens into a flotation basin 10 situated adjacent to gas-disengagement basin 1. Opening 8 is provided with trap 11, the opening 8 and the trap 11 comprising means associated with the flotation chamber 9 for effecting passage of a portion of the upwardly moving sewage in riser 3 with dissolved gas therein into the flotation chamber 9 so that gas is released from solution during upward flow of sewage in the flotation chamber to form gas bubbles attached to solid particles present in the upwardly flowing sewage and carry the particles to the top of the liquid in chamber 9. Oxygen-containing gas may be injected into riser 3 and downcomer 4 through spargers 12 and 13 respectively.

The apparatus shown in FIG. 2, like that shown in FIG. 1, has a gas-disengagement basin 1 with a deep shaft 2 extending into the ground below it and containing a riser 3 and a downcomer 4 separated by a partition 5. Riser 3 communicates through an opening 8, provided with a trap 11, with a flotation chamber 9 whose upper end opens into a flotation basin 10 situated adjacent to gas-disengagement basin 1. Riser 3 and downcomer 4 communicate with each other at their upper ends in basin 1 and at the lower end of shaft 2. In the apparatus of FIG. 2, however, downcomer 4 is located substantially coaxially within riser 3 and extends upwardly above basin 1, the upper end of partition 5 being bent over to form conduit 14 and leg 15, ie the upper end of partition 5, conduit 14 and leg 15 form an inverted U-shape. Liquid is circulated around the apparatus mechanically by propeller 16 in leg 15 and an oxygen-containing gas is injected into the liquid through sparger 17 situated in the upper end of downcomer 4.

The apparatus of the invention can be employed in the aeration and digestion stages of the secondary treatment of sewage. Its use in the aeration stage will be described. The method of operation in an aerobic digestion stage is similar.

When the apparatus is used in the aeration stage, sewage, after preliminary treatment to remove large or dense and intractable solid articles followed by optional primary settling, enters gas-disengagement basin 1 through an inlet channel (not shown in the drawings) opening into the basin 1, for example at a point near the open end of leg 15 in the apparatus shown in FIG. 2. Liquid plus activated sludge leaves basin 1 through another channel (not shown in the drawings) opening out of basin 1 at a point below the level A—A of liquid in the basin and located at a distance from the inlet channel and passes to a settling tank or basin. Liquid also leaves the apparatus through a channel 18 (shown only in FIG. 3 of the drawings) opening out of flotation basin 10 below the level B—B of liquid in that basin.

Figure 2:
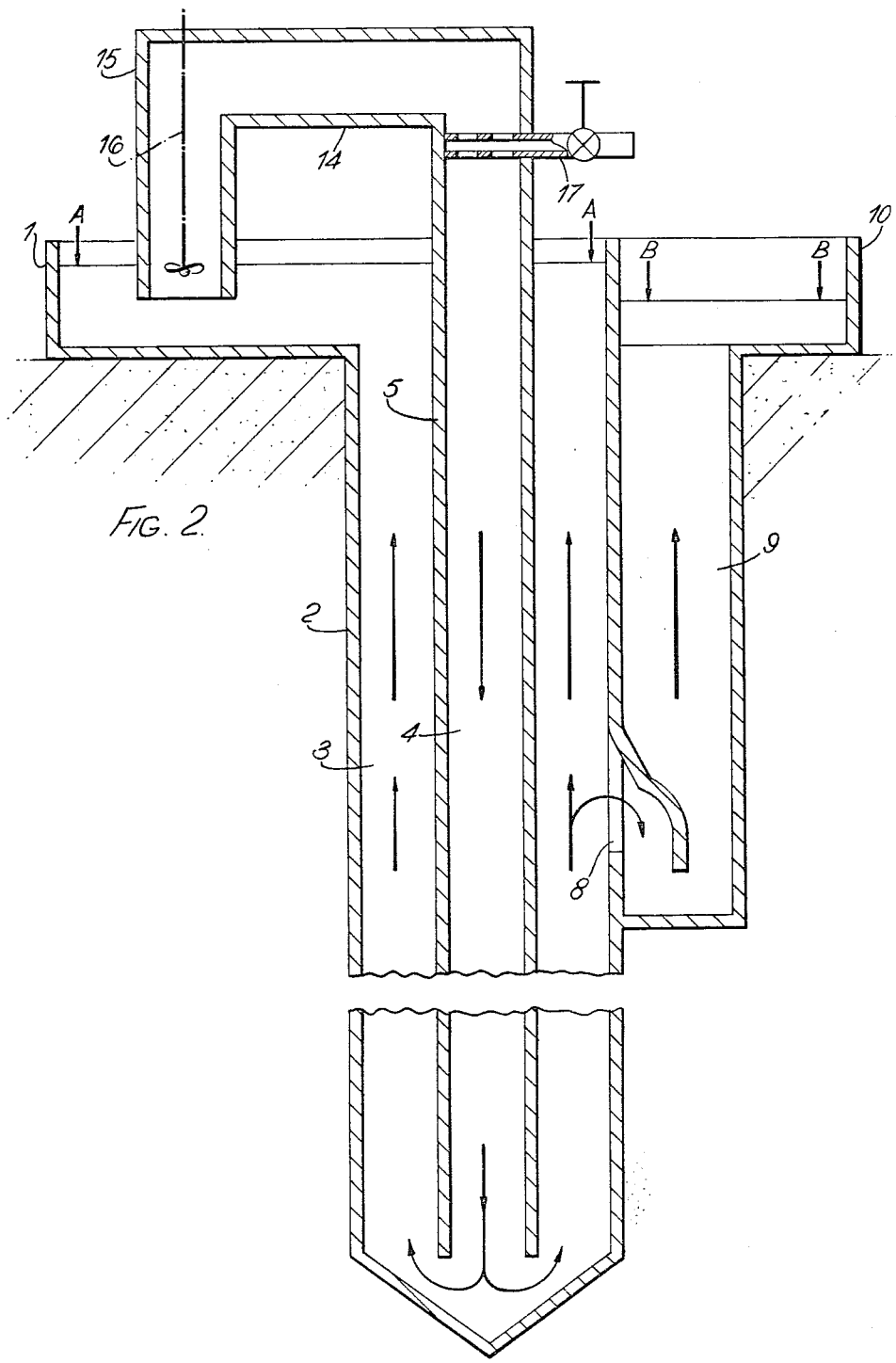
FIG. 2 is a cross-sectional elevation of another form of the apparatus of the invention in which liquid is circulated by mechanical means.

The apparatus shown in FIG. 1 is started up by injecting air from a compressor into riser 3 through sparger 12. This causes the upper part of riser 3 to operate as an air-lift pump and sewage begins to circulate around the apparatus in the direction shown by the arrows in FIG. 1. When the flow rate reaches a predetermined minimum value the injection of air into the downcomer through sparger 13 is commenced and gradually increased. Preferably this is done in stages as the velocity of the liquid in the downcomer increases. When the system is operating steadily all or most of the air is injected into downcomer 4.

In the apparatus shown in FIG. 2 circulation is achieved mechanically using propeller 16 and air is drawn into the upper part of the downcomer through sparger 17.

In both forms of the apparatus shown in FIGS. 1 and 2 of the drawings gas bubbles injected into the downcomer are borne rapidly downwards by the circulating sewage to levels of higher pressure and their size diminishes. Ultimately in the lower levels of a deeply-sunk apparatus many of the bubbles will be entirely absorbed into the sewage. As the sewage rises up the riser the bubbles will first reappear and then increase in size. Part of the sewage flowing up riser 3 passes through opening 8 into flotation chamber 9. Trap 11 prevents large air bubbles already present when the sewage reaches opening 8 from passing into flotation chamber 9 and thereby disturbing the flow in chamber 9. In flotation chamber 9 small air bubbles form in the sewage and these attach themselves to solid particles in the sewage and rise to the surface of the liquid in flotation basin 10 carrying the solid particles with them. Thus solid material in the sewage is carried to the surface of the liquid in flotation basin 10 by air flotation. From flotation basin 10 liquid leaves the apparatus (along a channel 18 shown in FIG. 3 of the drawings) whilst solid material is scraped from the surface and returned to gas-disengagement basin 1 (by scraper means 19 shown in FIG. 3 of the drawings).

The apparatus shown in FIGS. 3 and 3A embodies some of the features of FIG. 1 and some of the features of FIG. 2. It resembles FIG. 1 in that liquid is circulated around the apparatus by injection of an oxygen-containing gas thereinto through spargers 12 and 13. On the other hand it resembles FIG. 2 in that downcomer 4' (which is bounded by the tubular partition 5) is located coaxially within the riser 3' (which is bounded by the tubular deep shaft 2). In most other respects, the apparatus of FIG. 3 is very similar to, and functions in the same way as, the two forms of the apparatus shown in FIGS. 1 and 2, the main exception being that the flotation chamber 9' is inclined upwardly and outwardly away from the riser 3', instead of being vertically disposed adjacent to it. At its upper end, the flotation chamber 9' opens into a flotation basin 10', from the bottom of which clarified liquid effluent is led to a settling basin (not shown) through an outlet channel 18 and from the top of which flotated solid material is removed by scraper means 19 and returned to the gas-disengagement basin 1. Although, for the sake of simplicity, the scraper means 19 is shown as only covering the area between the basins 1 and 10', it will be appreciated that in practice it extends over substantially the whole of the solids in basin 10' and at least partially over the basin 1. The opening 8' from the riser 3' into the flotation chamber 9' is provided with a trap 11' and is, additionally, provided with louvres 20, which slope downwardly from the riser 3' into the flotation chamber 9' to ensure that the initial flow through the opening 8 is in a downward direction. The actual passage from the flotation chamber 9' into the flotation basin 10' is through a hole 21, one half of which opens into a semi-cylindrical pipe 22 which allows solid material to float directly to the top of the flotation basin 10', and the other half 23 of which allows clarified liquid from the flotation chamber 9' to pass directly to the bottom of flotation basin 10', escaping therefrom through the liquid effluent outlet channel 18.

We claim:

1. A method of treating sewage including a solids-liquid mixture in apparatus including a basin having a downcomer extending downwardly therefrom, and a riser operatively communicating with said downcomer both through said basin and at the lower end of said downcomer, said method comprising the steps of continuously circulating the sewage contained in the basin-downcomer-riser system down said downcomer, up said riser, and back down said downcomer until sufficient treatment of the sewage is achieved, and supplying oxygen-containing gas to said down-comer so that said gas flows co-currently with sewage flowing down said downcomer, and upwardly with said sewage in said riser, at least some of the oxygen-containing gas being dissolved in said sewage, the improvement comprising separating a portion of the upwardly moving sewage in said riser with dissolved gas contained therein from the sewage moving upwardly in said riser, and gradually decreasing the hydrostatic pressure on said separated portion to release the dissolved gas from solution to form gas bubbles attached to solid particles present in said separated sewage portion and thereby effectively separate the solid particles from the liquid in the separated sewage portion.

2. A method as recited in claim 1 wherein said steps of separating and gradually decreasing the hydrostatic pressure are accomplished by providing a flotation chamber operatively connected to said riser and extending upwardly from the area of connection with said riser, a portion of the upwardly moving sewage with dissolved oxygen therein in said riser passing into said flotation chamber, the solid particles being carried to the top of the liquid in said flotation chamber.

3. A method as claimed in claim 2, wherein the solid particles carried to the top of the liquid and the resulting clarified liquid below are removed separately from the system.

4. A method as recited in claim 2 wherein the mean velocity of upward flow of liquid in the flotation chamber is maintained below 0.3 m/sec.

5. A method as recited in claim 1 comprising the further step of preventing separation of gas bubbles having a diameter larger than one millimeter from the upwardly moving sewage in the riser.

6. A method as claimed in claim 1, wherein circulation of the solids-liquid mixture is achieved by injecting a gas into at least one mixture-containing duct of the downcomer-riser-basin system.

7. A method as claimed in claim 1, wherein circulation of the solids-liquid mixture is achieved by mechanical means.

8. Apparatus for sewage treatment comprising a basin, a downcomer having an upper opening therefore in operative communication with said basin and extending downwardly from said basin to a bottom opening, a riser having a bottom opening thereof in communication with the bottom opening of said downcomer and having an upper opening thereof in operative communication with said basin, said basin, downcomer, and riser comprising a basin-downcomer-riser system, means for continuously circulating the sewage contained in the basin-downcomer-riser system down said downcomer, up said riser, and back down said down-comer until sufficient treatment of the sewage is achieved, and means for supplying gas to said downcomer so that said gas flows co-currently with sewage in said riser, wherein the improvement comprises a flotation chamber operatively connected to said riser and extending upwardly from the area of connection thereof to said riser, and means associated with said flotation chamber for effecting passage of a portion of the upwardly moving sewage in said riser with dissolved gas therein into said flotation chamber so that the dissolved gas is released from solution during upward flow of sewage in said flotation chamber to form gas bubbles attached to solid particles present in said upwardly flowing sewage to carry the solid particles to the top of the liquid in said flotation chamber.

9. Apparatus as recited in claim 8 wherein said downcomer and riser comprise a shaft internally divided by a partition.

10. An apparatus as claimed in claim 9, wherein the internal partition comprises a hollow tube located substantially coaxially within the shaft.

11. Apparatus as recited in claim 8 wherein said means associated with said flotation chamber for effecting passage of a portion of the upwardly moving sewage into said flotation chamber comprises an opening from said riser into said flotation chamber, and trap means for preventing large bubbles, compared to said gas bubbles attached to solid particles, from passing from said riser into said flotation chamber.

12. An apparatus as claimed in claim 11, including means providing in the opening for causing the mixture to flow initially downwardly on entering the flotation chamber.

13. An apparatus as claimed in claim 12, wherein the said means comprises at least one louvre located within the opening and extending downwardly from the duct towards the flotation chamber.

14. An apparatus as claimed in claim 8, including means for removing from the system solid particles carried to the top of the liquid and means for withdrawing from the system the resulting clarified liquid below.